US 11,241,928 B2

(12) United States Patent
Kim et al.

(10) Patent No.: US 11,241,928 B2
(45) Date of Patent: Feb. 8, 2022

(54) HYBRID SUSPENSION ARM FOR VEHICLE

(71) Applicant: ILJIN CO., LTD., Gyeongju-si (KR)

(72) Inventors: Hyun Woo Kim, Gyeongju-si (KR);
Sung Keun Lee, Gyeongju-si (KR);
Tae Sung Kwon, Gyeongju-si (KR);
Dae Ju Lee, Gyeongju-si (KR); Min Kook Park, Gyeongju-si (KR); Soon Chan Kwon, Gyeongju-si (KR)

(73) Assignee: ILJIN Co., Ltd., Gyeongju-si (KR)

( * ) Notice: Subject to any disclaimer, the term of this patent is extended or adjusted under 35 U.S.C. 154(b) by 106 days.

(21) Appl. No.: 16/454,557

(22) Filed: Jun. 27, 2019

(65) Prior Publication Data

US 2019/0315173 A1 Oct. 17, 2019

Related U.S. Application Data

(63) Continuation of application No. PCT/KR2017/015102, filed on Dec. 20, 2017.

(30) Foreign Application Priority Data

Dec. 27, 2016 (KR) .......................... 10-2016-0180194

(51) Int. Cl.
*B60G 7/00* (2006.01)
*B29C 45/14* (2006.01)
(Continued)

(52) U.S. Cl.
CPC ........ *B60G 7/001* (2013.01); *B29C 45/14344* (2013.01); *B29K 2077/00* (2013.01);
(Continued)

(58) Field of Classification Search
CPC .............. B60G 7/001; B60G 2206/013; B60G 2206/014; B60G 2206/10;
(Continued)

(56) References Cited

U.S. PATENT DOCUMENTS

2010/0084834 A1* 4/2010 Ersoy ................... B60G 7/001
280/124.1
2012/0315414 A1* 12/2012 Wesch ................. B62D 29/005
428/34.1
(Continued)

FOREIGN PATENT DOCUMENTS

DE 202006012717 U1 11/2006
DE 102007015616 A1 10/2008
(Continued)

OTHER PUBLICATIONS

International Search Report for PCT/KR2017/015102 dated Mar. 26, 2018.

*Primary Examiner* — Paul N Dickson
*Assistant Examiner* — Scott F. Underwood
(74) *Attorney, Agent, or Firm* — Dinsmore & Shohl LLP; Yongsok Choi, Esq.

(57) ABSTRACT

The present disclosure provides a hybrid suspension arm for a vehicle, having excellent durability. A hybrid suspension arm for a vehicle according to one embodiment of the present disclosure comprises: a suspension arm body which is made of metal material and comprises a top plate part and two sidewall parts extending downward from the top plate part to be open downward; and an insert molding which is made of plastic material and is formed by being insert-molded in the suspension arm body, wherein a thickness of at least a portion in the portion of the insert molding that comes in contact with the top plate part and the sidewall parts is in the range of 2 mm to 3 mm.

11 Claims, 11 Drawing Sheets

(51) Int. Cl.
 B29K 77/00 (2006.01)
 B29K 309/08 (2006.01)
 B29L 31/30 (2006.01)

(52) U.S. Cl.
 CPC ....... *B29K 2309/08* (2013.01); *B29L 2031/30* (2013.01); *B60G 2206/013* (2013.01); *B60G 2206/7101* (2013.01); *B60G 2206/72* (2013.01)

(58) Field of Classification Search
 CPC ........ B60G 2206/122; B60G 2206/124; B60G 2206/7101; B60G 2206/72; B60G 2206/722; B29C 45/14344; B29K 2077/00; B29K 2309/08; B29L 2031/30
 See application file for complete search history.

(56) References Cited

U.S. PATENT DOCUMENTS

| | | |
|---|---|---|
| 2013/0049391 A1 | 2/2013 | Kurogi et al. |
| 2015/0151605 A1 | 6/2015 | Kuroda |
| 2016/0229247 A1 | 8/2016 | Kuroda |
| 2019/0061452 A1* | 2/2019 | Lee ................... F16C 11/06 |

FOREIGN PATENT DOCUMENTS

| | | |
|---|---|---|
| DE | 102011120180 A1 | 6/2013 |
| EP | 1853441 A1 | 11/2007 |
| FR | 2835024 A1 | 7/2003 |
| JP | H08197923 A | 8/1996 |
| JP | 2005299898 A | 10/2005 |
| KR | 20090122978 A | 12/2009 |
| KR | 1020110038832 A | 4/2011 |
| KR | 20120105470 A | 9/2012 |
| KR | 101393849 B1 | 5/2014 |
| KR | 20160129202 A | 11/2016 |
| WO | 2004041622 A2 | 5/2004 |
| WO | 2015145566 A1 | 10/2015 |
| WO | 2016175417 A1 | 11/2016 |

* cited by examiner

HYBRID SUSPENSION ARM FOR VEHICLE

CROSS-REFERENCE TO RELATED APPLICATION

This application is a continuation of PCT/KR2017/015102 filed on Dec. 20, 2017, which claims priority to Korean Patent Application No. 10-2016-0180194 filed on Dec. 27, 2016, the entire contents of which are herein incorporated by reference.

TECHNICAL FIELD

The present disclosure relates to a suspension arm of a vehicle suspension system. More particularly, the present disclosure relates to a hybrid suspension arm for a vehicle, which is formed of composite material.

BACKGROUND ART

A suspension arm used in a vehicle suspension system is known in the art. The conventional suspension arm is classified into a casting type suspension arm and a press type suspension arm according to a manufacturing method. The casting type suspension arm is manufactured by pouring molten steel into a mold and then solidifying the molten steel, and a press type suspension arm is manufactured by welding two plates formed from a steel plate by press process.

However, a weight of the conventional suspension arm is heavy due to a characteristic of steel material, and thus it is difficult to reduce the weight. Further, deformation may occur due to welding of the steel plates, and thus there is a defect in that strength may be degraded.

SUMMARY

Technical Problem

In order to solve the defect of the conventional suspension arm made of steel material, a suspension arm formed of composite material of metal and plastic (hereinafter, referred to as a hybrid suspension arm) has been proposed. For example, the hybrid suspension arm can be formed by insert injection molding plastic material in a suspension arm body made of steel material. However, when cooling is performed after insert injection molding, an insert molding made of plastic material, which has a shrinkage rate that is greater than that of steel, may shrink more than the suspension arm body, and the insert molding may be separated from the suspension arm body made of steel material. As a result, overall strength of the suspension arm body may be degraded. Consequently, in the conventional hybrid suspension arm, a thickness of the portion of the insert molding, which is brought into contact with the suspension arm body, is controlled to be thin.

However, such a conventional hybrid suspension arm has a risk of being degraded in durability (as described in detail below).

The present disclosure is directed to providing a hybrid suspension arm for a vehicle, which solves the above-described defects and has excellent durability.

Technical Solution

The present disclosure provides exemplary embodiments of a hybrid suspension arm for a vehicle. A hybrid suspension arm for a vehicle according to an exemplary embodiment of the present disclosure comprises: a suspension arm body made of metal material and comprising a top plate part and two sidewall parts extending downward from the top plate part to be open downward; and an insert molding made of plastic material and formed by being insert-molded in the suspension arm body, wherein a thickness of at least a portion in the portion of the insert molding in contact with the top plate part and the sidewall parts may be in a range of 2 mm to 3 mm.

In one embodiment of the present disclosure, an overall thickness of the portion of the insert molding in contact with the top plate part and the sidewall parts may be in a range of 2 mm to 3 mm.

In one embodiment of the present disclosure, at least one hole may be formed to pass through the suspension arm body, at least one coupling protrusion extending to pass through the at least one hole and expanding from the at least one hole by a predetermined area may be formed in the insert molding, and a thickness of the expanded portion of the coupling protrusion may be in a range of 2 mm to 3 mm.

In one embodiment of the present disclosure, at least one reinforcing rib may be formed to protrude from the insert molding, and a thickness of the reinforcing rib may be in a range of 2 mm to 5 mm.

In one embodiment of the present disclosure, the reinforcing rib may comprise portion extending between two facing sidewall parts of the insert molding and portion intersecting with the portion extending between the two facing sidewall parts of the insert molding.

In one embodiment of the present disclosure, the hybrid suspension arm for vehicle may further comprise at least one reinforcing plate made of metal material, installed in the suspension arm body, and having both side walls fixed to the suspension arm body to support the suspension arm body, wherein the reinforcing plate may comprise a side surface facing the top plate part, a portion of the insert molding may be formed between the side surface of the reinforcing plate and an inner surface of the top plate part, and the reinforcing plate may be embedded in the insert molding so as to surround all surfaces of the reinforcing plate, except for the both side walls, by insert molding, such that the insert molding may be prevented from being separated from the suspension arm body due to the reinforcing plate.

In one embodiment of the present disclosure, at least one hole filled with the insert molding may be formed to pass through the reinforcing plate.

In one embodiment of the present disclosure, a thickness of the portion of the insert molding formed on a side surface of the reinforcing plate, which is opposite to the side surface facing the top plate part, may be in a range of 2.5 mm to 3 mm.

In one embodiment of the present disclosure, a thickness of the portion of the insert molding formed on side surfaces of the reinforcing plate in a thickness direction may be in a range of 2.5 mm to 3 mm.

In one embodiment of the present disclosure, a flange may be formed on the suspension arm body by bending an end portion of the sidewall part, and a thickness of the portion of the insert molding in contact with an end of the flange may be in a range of 2.5 mm to 3 mm. In one embodiment of the present disclosure, a suspension arm body may be formed of steel material.

In one embodiment of the present disclosure, the insert molding may be formed of fiber-reinforced plastic material.

Advantageous Effects

In the hybrid suspension arm according to one embodiment of the present disclosure, it is possible to ensure that any portion of a suspension arm body to covered with a plastic insert molding is not unintentionally exposed to the outside (while satisfying weight reduction and strength which are required as a vehicle suspension arm). Therefore, it is possible to reduce the risk that when a portion of the suspension arm body covered with the plastic insert molding is exposed to the outside, water penetrates into a gap, which is formed between the suspension arm body and the plastic insert molding, through the exposed portion to be collected in the gap, such that the suspension arm body is corroded. That is, durability of the suspension arm can be enhanced.

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Throughout this disclosure, when a component is referred to as being "connected" or "coupled" to another component, the component can be directly connected or coupled to another component, or can be indirectly connected or coupled to another component by intervening yet another component therebetween.

Hereinafter, exemplary embodiments of the present disclosure will be described with reference to the accompanying drawings. In the accompanying drawings, the same reference numerals are assigned to the same or corresponding components. Further, in the following description of the embodiments, a duplicate description of the same or corresponding components may be omitted. However, even though a description of a component is omitted, such a component is not intended to be excluded in any embodiment.

A vehicle suspension system is a device for connecting a wheel to a vehicle body and comprises a spring for absorbing vibrations or impacts transmitted from a road surface to the vehicle body, a shock absorber for adjusting an action of the spring, a suspension arm or suspension link for controlling an operation of the wheel. Type of suspension systems for controlling the operation of the wheel include a swing arm type, a wishbone type, and a McPherson strut type or the like. For example, in a suspension system using a wishbone type control type control, a suspension arm for connecting a knuckle engaged with a wheel to a vehicle body (e.g., an upper control arm and a lower control arm) is employed. One end of the suspension arm is connected to a cross member or a subframe constituting the vehicle body, and the other end of the suspension arm is connected to the knuckle via a ball joint. Such a suspension arm allows the vehicle wheel to be supported by the vehicle body, and appropriately controls tie-in of the vehicle wheel in accordance with the running status of the vehicle, thereby improving the straight running performance and the steering stability of the vehicle. Exemplary embodiments of a hybrid suspension arm for a vehicle, which will be described below, may be used as an upper control arm or a lower control arm in a vehicle suspension system.

Figure 1:
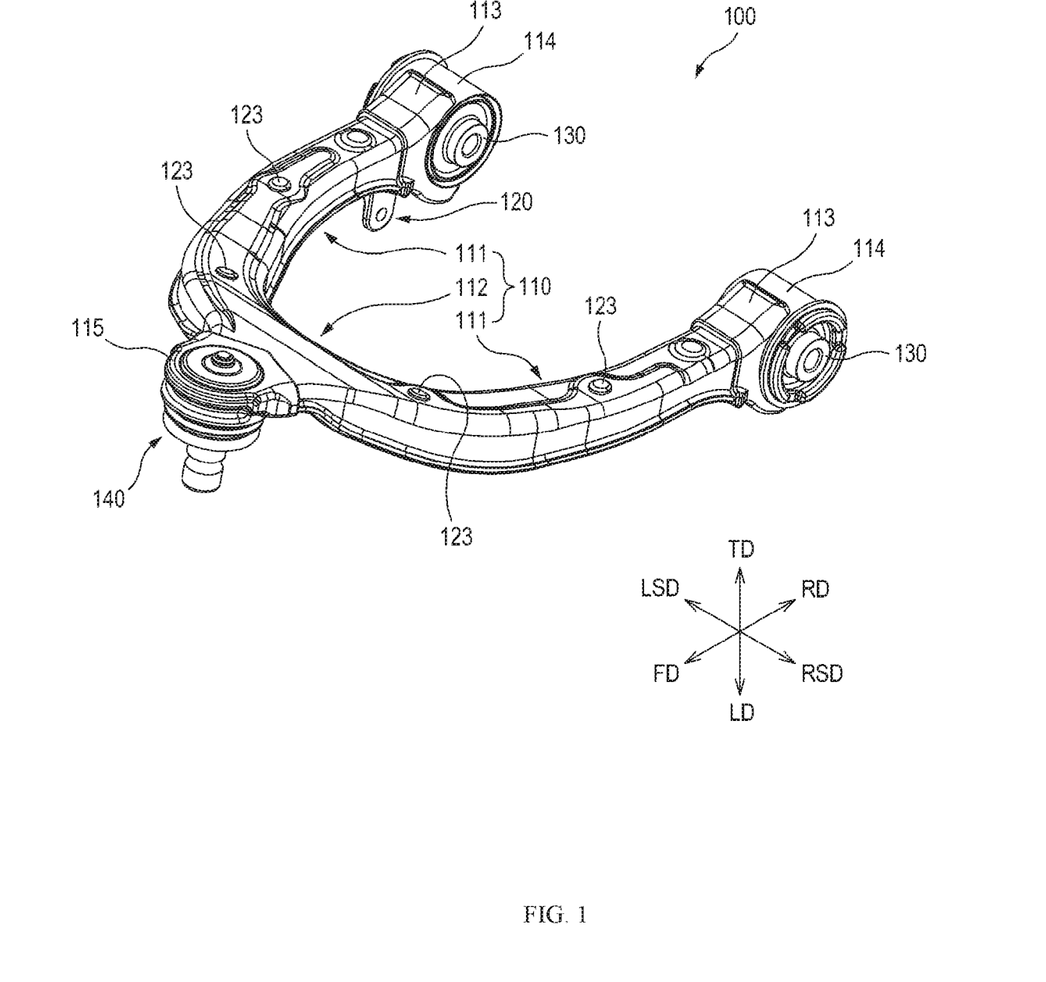
FIG. 1 is a perspective view illustrating a hybrid suspension arm for a vehicle according to one embodiment of the present disclosure.
Figure 2:
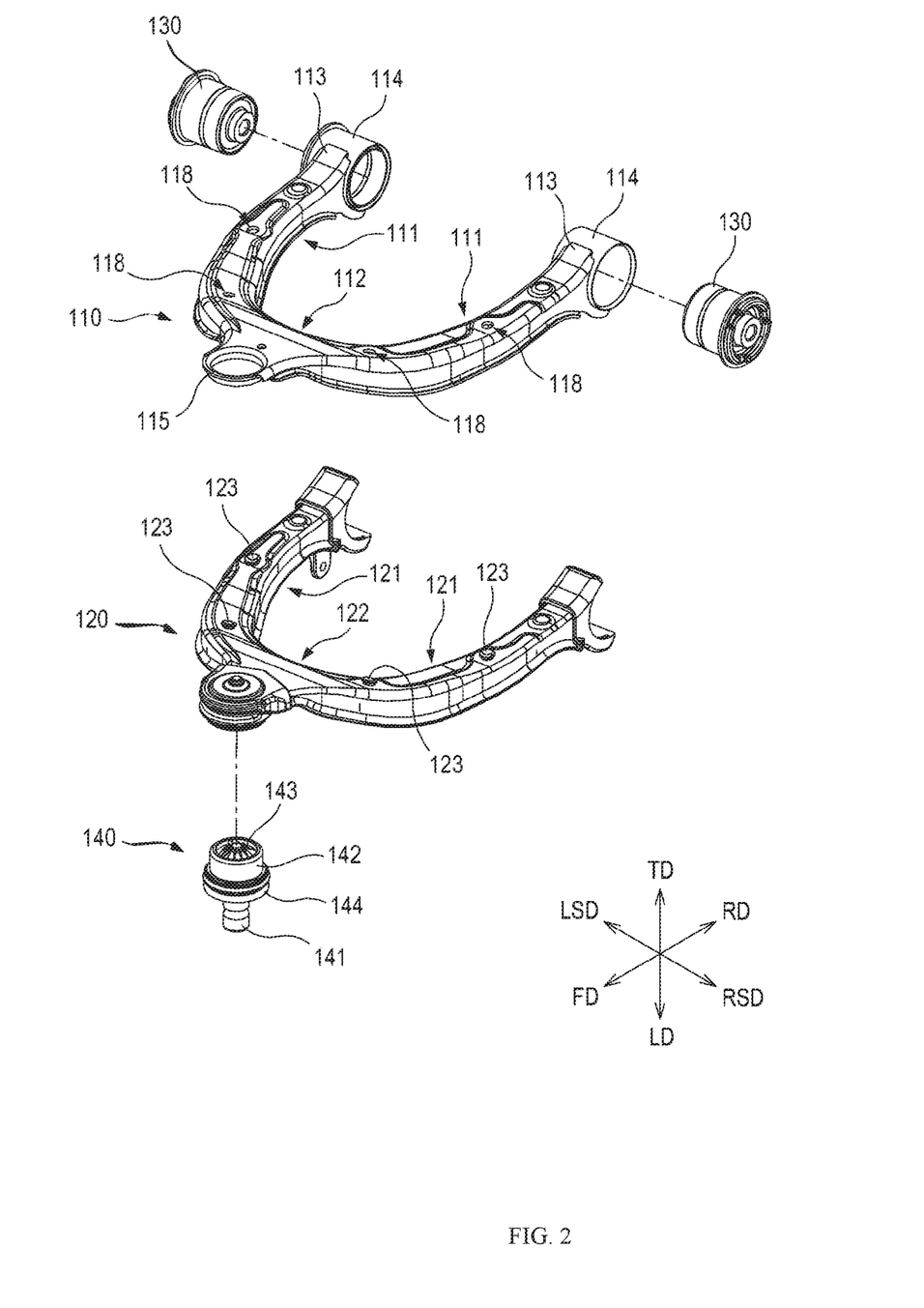
FIG. 2 is an exploded perspective view illustrating the hybrid suspension arm for a vehicle shown in FIG. 1.

FIG. 1 is a perspective view illustrating a hybrid suspension arm for a vehicle according to one embodiment of the present disclosure, and FIG. 2 is an exploded perspective view illustrating the hybrid suspension arm for a vehicle shown in FIG. 1. Further, FIG. 3 is a perspective view illustrating a state, in which a suspension arm body is separated from a plastic insert molding, in the hybrid suspension arm for a vehicle according to a modified example.

Figure 3:
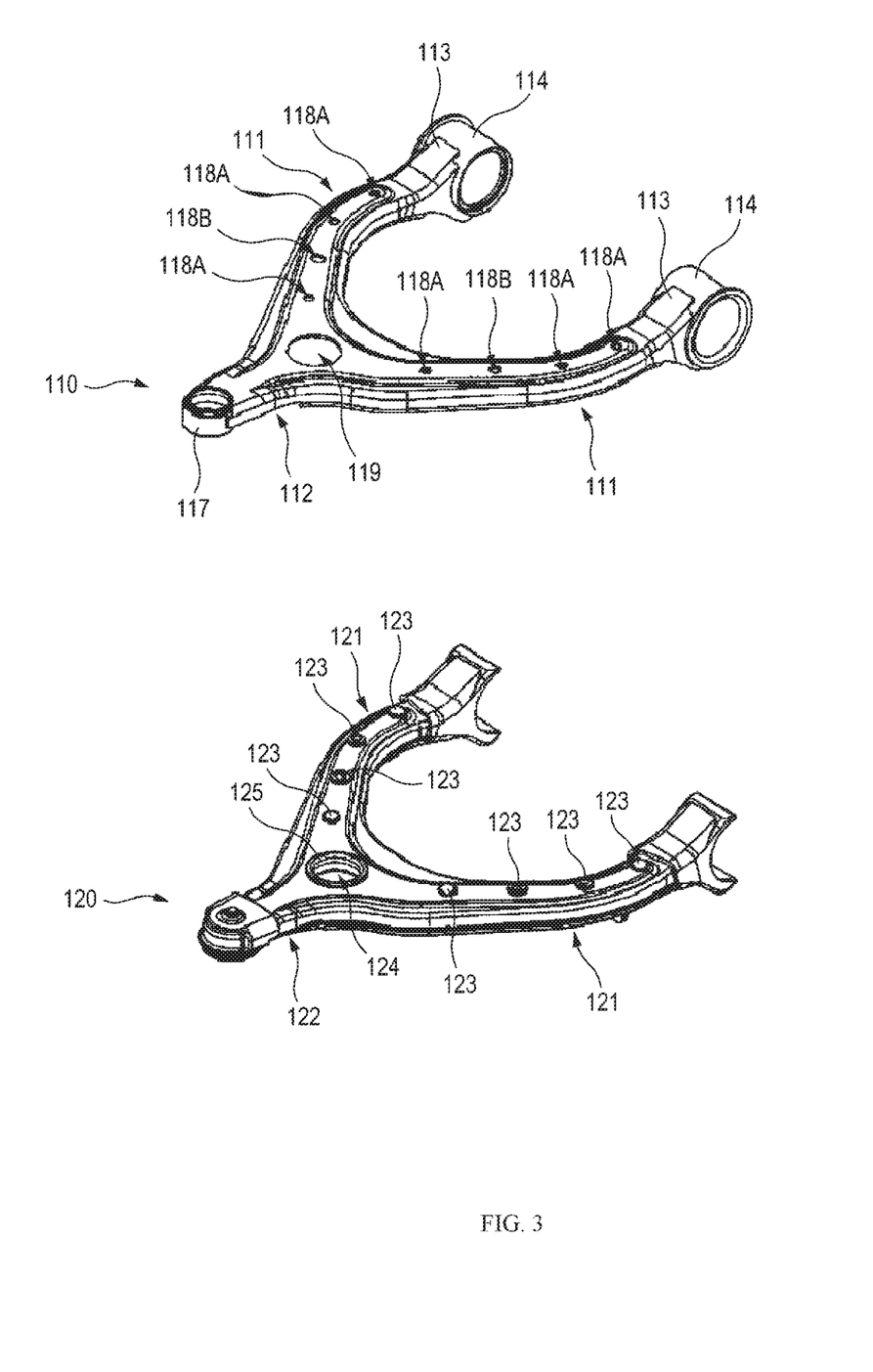
FIG. 3 is a perspective view illustrating a state in which a suspension arm body is separated from a plastic insert molding in a modified example of the hybrid suspension arm for a vehicle shown in FIG. 1.

Referring to FIGS. 1 to 3, a hybrid suspension arm 100 for a vehicle according to one embodiment of the present disclosure (hereinafter, simply referred to as a "hybrid suspension arm") comprises a suspension arm body 110 made of metal material, and an insert molding 120 made of plastic material, which is formed by being insert-molded in the suspension arm body 110 (hereinafter, referred to as a "plastic insert molding"). The hybrid suspension arm 100 may further comprise a bush 130 and a ball joint 140 so as to be connected to a vehicle body and a knuckle.

The hybrid suspension arm 100 has a "U" shape or a shape similar thereto. The hybrid suspension arm 100 may be used as an upper control arm in a vehicle suspension system.

The suspension arm body 110 may be formed of steel material and manufactured by press processing. For example, the suspension arm body 110 may be manufactured by pressing a high-tension steel plate for a vehicle.

The suspension arm body 110 comprises two leg parts 111 and a joint part 112 for connecting the two leg parts 111. A pipe coupling part 113 forming a generally semi-cylindrical concave groove is formed on one end portion of the leg part 111 (an end portion of the leg part 111 facing a rear direction RD in FIGS. 1 and 2), and a bush pipe 114 is fitted into the pipe coupling part 113 and coupled thereto by welding. The bush pipe 114 is coupled to the pipe coupling part 113 so as to be open in a side direction, and a bush 130 is coupled to the bush pipe 114 by press inserting. An annular mounting protrusion 115 for mounting a ball joint 140 is formed to protrude from one end portion of the joint part 112 (an end portion of the joint part 112 facing a front direction FD in FIGS. 1 and 2). In one embodiment of the present disclosure, the annular mounting protrusion 115 is integrally formed on the joint part 112 so as to mount the ball joint 140. However, as shown in FIG. 3, a ball joint pipe 117 which is separately formed may be coupled to one end portion of the joint part 112 by welding.

For a solid coupling to the plastic insert molding 120, at least one hole 118 is formed to pass through the suspension arm body 110. In one embodiment of the present disclosure, a plurality of holes 118 are formed to pass through the leg part 111 by being spaced apart from each other. The plurality of holes 118 may be formed to have the same diameter. Alternatively, the plurality of holes 118 may be formed by combining a hole 118A having a small diameter and a hole 118B having a large diameter, as shown in FIG. 3. The holes 118A and 118B having different diameters may be disposed in various manners (e.g., the holes 118A and 118B may be alternately disposed). Further, the hole 118B having a large diameter may be selectively disposed at portions in which a coupling force between the suspension arm body 110 and the plastic insert molding 120 is more required. Meanwhile, as shown in FIG. 3, a hole 119 for increasing a coupling force with the plastic insert molding 120 may also be formed in the joint part 112. Since the joint part 112 has a larger area in contact with the plastic insert molding 120 than that of the leg part 111, the hole 119 formed in the joint part 112 may be formed to have a larger diameter than that of the hole 118 formed in the leg part 111.

The plastic insert molding 120 has a shape corresponding to the suspension arm body 110, i.e., has a "U" shape or a shape similar thereto. That is, similar to the suspension arm body 110, the plastic insert molding 120 comprises two leg parts 121 and a joint part 122 for connecting the two leg parts 121. The plastic insert molding 120 may be formed of high strength plastic material so as to be coupled to the suspension arm body 110 to reinforce strength of the hybrid suspension arm 100. In one embodiment of the present disclosure, the plastic insert molding 120 may be formed of fiber-reinforced plastic material. Specifically, the plastic insert molding 120 may be formed of polyamide resin such as nylon 6 (PA6), nylon 66 (PA66), or the like, or polyamide resin in which glass fiber is contained in nylon 6, nylon 66, or the like.

A coupling protrusion 123 corresponding to the hole 118 of the suspension arm body 110 is formed in the plastic insert molding 120. The coupling protrusion 123 is formed by extending to pass through the hole 118 formed in the suspension arm body 110 and expanding from the hole 118 by a certain area (a predetermined area). That is, the coupling protrusion 123 is a deformed portion by pressing the portion of the plastic insert molding 120, which is filled in the hole 118 and then is pushed out to the outside of the suspension arm body 110 through the hole 118 during the insert molding process of the plastic insert molding 120. The coupling protrusion 123 increases the coupling force between the suspension arm body 110 and the plastic insert molding 120 and prevents the plastic insert molding 120 from being arbitrarily separated from the suspension arm body 110.

Figure 4:
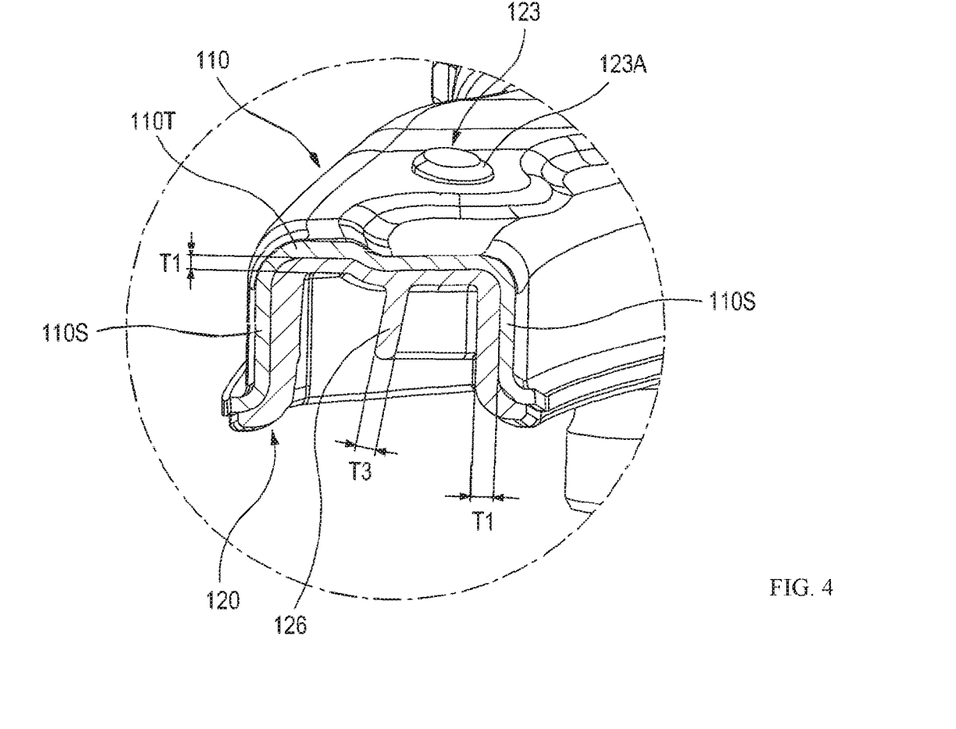
FIG. 4 is a cross-sectional view illustrating a portion adjacent to a portion in which a coupling protrusion of a leg part is formed in the hybrid suspension arm for a vehicle shown in FIG. 1.
Figure 5:
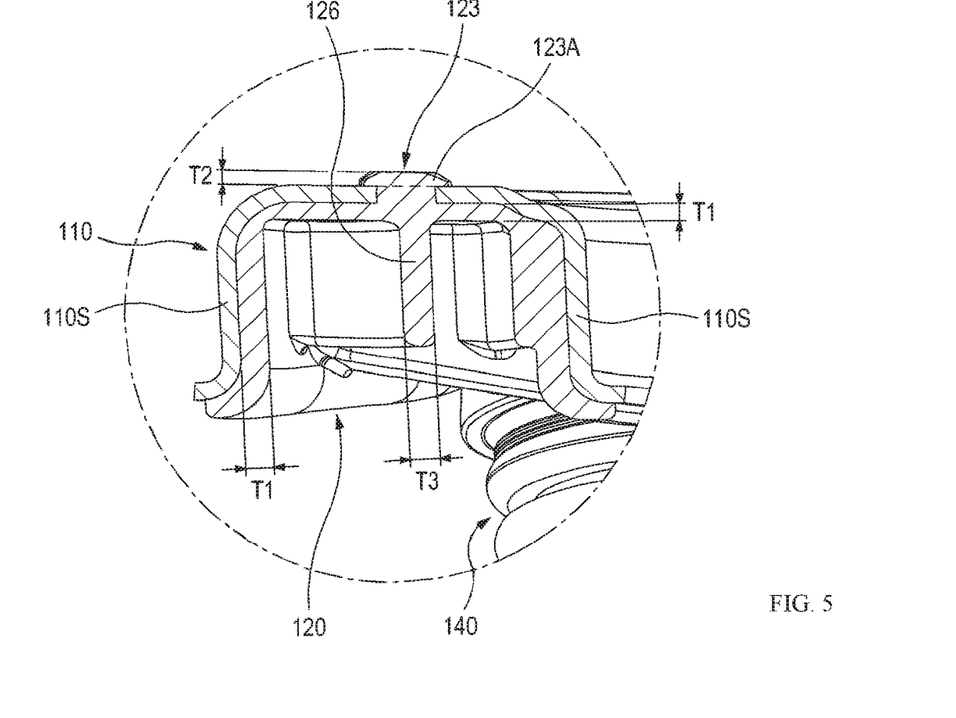
FIG. 5 is a cross-sectional view illustrating the portion in which the coupling protrusion of the leg part is formed in the hybrid suspension arm for a vehicle shown in FIG. 1.

The coupling protrusion 123 may be formed such that an area of an expanded portion 123A (e.g., an area pressed by the suspension arm body 110 due to deformation) varies according to a diameter size of the hole 118 (see FIGS. 4 and 5). For example, the coupling protrusion 123 may be formed such that the area of the expanded portion 123A is increased or decreased in proportion to the diameter sizes of the holes 118A and 118B.

When the hole 119 is formed in the joint part 112 of the suspension arm body 110, a through-hole 124 corresponding to the hole 119 may be formed in the plastic insert molding 120, and an annular coupling protrusion 125 may be formed to protrude from a periphery of the through-hole 124. The annular coupling protrusion 125 extends to pass through the hole 119 formed in the joint part 112, and an upper end portion of the annular coupling protrusion 125 passing through the joint part 112 has a shape which is bent in a radially outward direction of the hole 119. In addition to the coupling protrusion 123, the coupling protrusion 125 increases the coupling force between the suspension arm body 110 and the plastic insert molding 120.

The ball joint 140 mounted on the hybrid suspension arm 100 comprises a ball stud 141 in which a round bar is attached to a ball portion, a socket 142 for accommodating the ball portion of the ball stud 141, a ball seat 143 coupled to the socket 142 and configured to support the ball stud 141 to be rotatable in an arbitrary direction, and a dust cover 144 for preventing foreign materials from flowing in the socket 142.

FIG. 4 is a cross-sectional view illustrating a portion adjacent to a portion in which a coupling protrusion of a leg part is formed in the hybrid suspension arm for a vehicle shown in FIG. 1, and FIG. 5 is a cross-sectional view illustrating the portion in which the coupling protrusion of the leg part is formed in the hybrid suspension arm for a vehicle shown in FIG. 1.

Referring to FIG. 4, the suspension arm body 110 is formed to have a top plate part 110T and sidewall parts 110S which is bent to extend from the top plate part 110T. That is, the suspension arm body 110 comprises a top plate part 110T and two sidewall parts 110S extending downward from the top plate part 110T to be open downward. The top plate part 110T and the sidewall parts 110S may be formed over at least a portion or an entirety of the leg parts 111 and the joint part 112. The plastic insert molding 120 is formed by being insert-molded inside the suspension arm body 110 surrounded by the top plate part 110T and the two sidewall parts 110S facing each other, so as to be able to support the suspension arm body 110. The plastic insert molding 120 is set to have a predetermined thickness range.

Inventors of the present disclosure recognized that, when a portion of the suspension arm body to be covered with the plastic insert molding is exposed to the outside, e.g., when a portion of the suspension arm body (to be covered with the plastic insert molding) is unintentionally directly exposed to the outside without being covered with the plastic insert molding during manufacturing of the hybrid suspension arm, or when a portion of the suspension arm body is too thinly covered with the plastic insert molding unintentionally, and the plastic insert molding is delaminated during the use of the hybrid suspension arm, and thus the portion of the suspension arm body is exposed to the outside, water penetrates into a gap formed between the suspension arm body and the plastic insert molding through the exposed portion and the suspension arm body may be corroded.

On the basis of the above-described recognition, a thickness of the portion of the plastic insert molding 120 in contact with the suspension arm body 110, e.g., a thickness of at least a portion in the portion of the plastic insert molding 120 in contact with the top plate part 110T and the sidewall parts 110S of the suspension arm body 110 is in a range of 2 mm to 3 mm in one embodiment of the present disclosure, in order to ensure that a portion of the suspension arm body 110 to be covered with the plastic insert molding is not unintentionally exposed to the outside. (In the present disclosure, the description that a thickness of a plastic insert molding has a predetermined range means that a design thickness has a predetermined range. In other words, in the present disclosure, the description that a thickness of the plastic insert molding has a predetermined range includes that even though a thickness of a specific individual suspension arm product may be exceptionally out of a predetermined range due to a manufacturing error, the suspension arm product is actually designed and manufactured to have a thickness in a predetermined range.) Preferably, an overall thickness T1 of the portion of the plastic insert molding 120 in contact with the top plate part 110T and the sidewall parts 110S is in a range of 2 mm to 3 mm.

In the above range of the thickness T1, even though a manufacturing tolerance occurs, a non-formation portion is prevented from occurring on the plastic insert molding 120 in contact with the top plate part 110T and the sidewall parts 110S, and thus durability of the hybrid suspension arm 100 may be improved. Here, the manufacturing tolerance include a machining tolerance (dimension tolerance) occurring during forming the suspension arm body 110, a position tolerance occurring when installing the suspension arm body 10 into a mold, and the like. Such a manufacturing tolerance becomes a factor of degrading consistency (matching) between the suspension arm body 110 and the plastic insert molding 120.

That is, when the thickness T1 of the plastic insert molding 120 in direct contact with the top plate part 110T and the sidewall parts 110S is less than 2 mm, the thickness of the plastic insert molding 120 is thin and thus a non-formation portion may occur during insert molding of the plastic insert molding 120 due to a manufacturing tolerance. Further, when the thickness T1 of the plastic insert molding 120 in direct contact with the top plate part 110T and the sidewall parts 110S exceeds 3 mm, the thickness of the plastic insert molding 120 is thick and thus a shrinkage of the plastic insert molding 120 becomes large and a gap of degrading strength of the hybrid suspension arm 100 may be formed.

Referring to FIG. 5, a thickness T2 of the expanded portion 123A of the coupling protrusion 123, which increases the coupling force between the suspension arm body 110 and the plastic insert molding 120, is in a range of 2 mm to 3 mm. When the thickness T2 of the expanded portion 123A of the coupling protrusion 123 is less than 2 mm, the coupling protrusion 123 may be formed to have a thin thickness due to the manufacturing tolerance of the suspension arm body 110. In this case, the expanded portion 123A of the coupling protrusion 123 may be easily damaged (e.g., cracked or separated) by vibrations or impacts transmitted from a road surface to the hybrid suspension arm 100. Consequently, when the hybrid suspension arm 100 is used, a portion of the plastic insert molding 120 may be arbitrarily separated from the suspension arm body 110 and it difficult to maintain the strength of the hybrid suspension arm 100. Further, when the thickness T2 of the expanded portion 123A of the coupling protrusion 123 exceeds 3 mm, insert-molding process should be performed such that the plastic insert molding 120 is pushed out through the hole 118 of the suspension arm body 110 in a long length, as a result there is difficulty on designing and manufacturing of a mold. Further, since the coupling protrusion 123 is formed to be thicker more than necessary, there is a risk that impacts may be applied to the coupling protrusion 123 due to interference with other components during transportation, storage, and installation of the hybrid suspension arm 100, and an aesthetically pleasing feeling of the hybrid suspension arm 100 may be degraded.

In the hybrid suspension arm 100 according to one embodiment of the present disclosure, an end portion of the sidewall part 110S is formed to be bent outward the suspension arm body 110. For weight reduction of the hybrid suspension arm 100, the end portion of the sidewall part 110S and the plastic insert molding 120 formed to be brought into contact with the end portion of the sidewall part 110S may be cut by trimming process.

Figure 6:
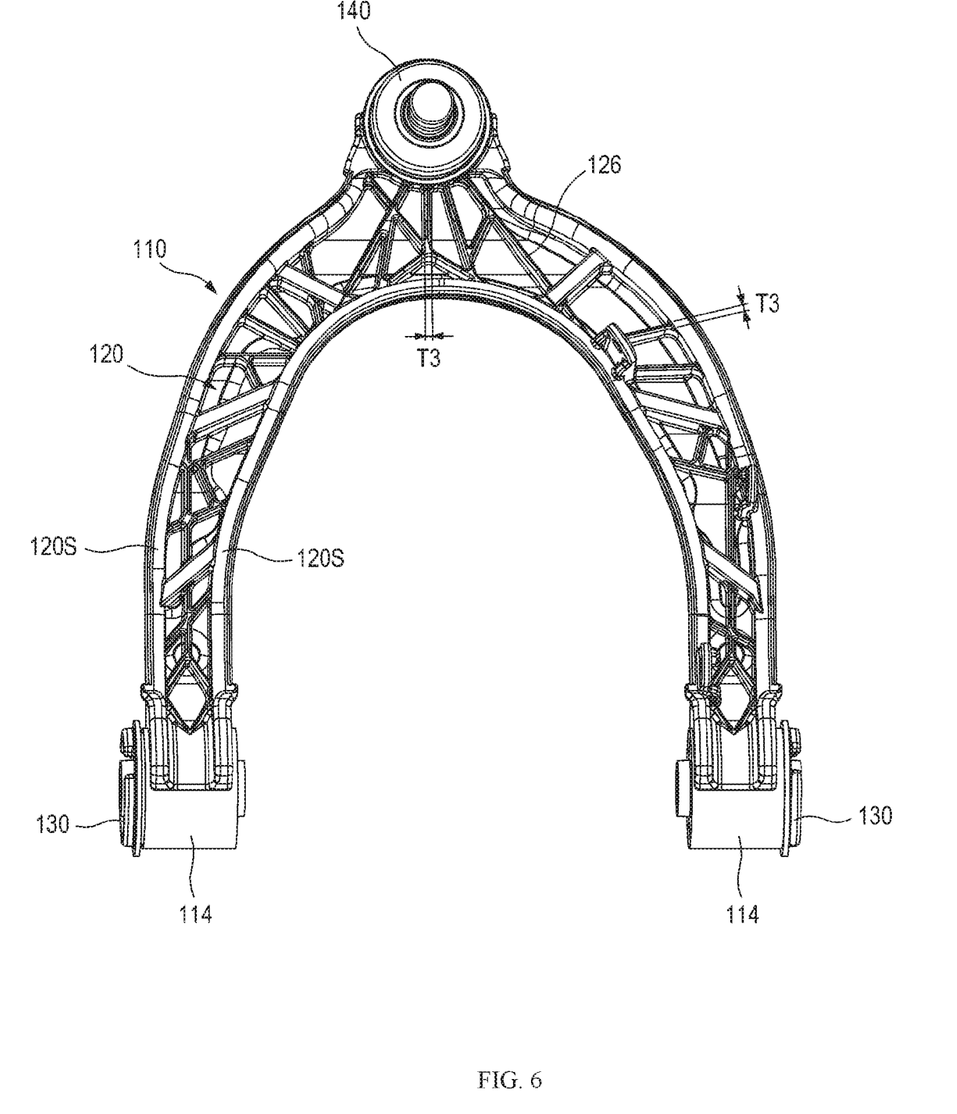
FIG. 6 is a bottom view illustrating the hybrid suspension arm for a vehicle shown in FIG. 1.

FIG. 6 is a bottom view illustrating the hybrid suspension arm for a vehicle shown in FIG. 1.

Referring to FIG. 6, at least one reinforcing rib 126 is formed to protrude from the plastic insert molding 120 so as to maintain the strength of the hybrid suspension arm 100 and prevent deformation of the hybrid suspension arm 100 due to an external force. The reinforcing rib 126 comprises both of portion extending between two facing sidewall parts 120S of the plastic insert molding 120 and portion intersecting with the portion extending between two sidewall parts 120S.

The reinforcing rib 126 is not a portion of the plastic insert molding 120 in direct contact with the suspension arm body 110. Thus, the thickness limitation, such as the thickness limitation of the plastic insert molding 120 in direct contact with the suspension arm body 110 according to the present disclosure, is not required. Accordingly, the thickness of the portion of the plastic insert molding 120 in direct contact with the suspension arm body 110 is formed be in the range of 2 mm to 3 mm, and then a shape and a thickness of the reinforcing rib 126 may be set in the above thickness condition to allow the plastic insert molding 120 to serve to reinforce local strength of the suspension arm body 110 while minimizing an overall weight of the plastic insert molding 120. For example, the reinforcing rib 126 may be formed in a lattice shape or the like on portions of the hybrid suspension arm 100 to which a large load is applied due to vibrations or impacts transmitted to the hybrid suspension arm 100, and the reinforcing rib 126 may be formed with a thickness that is thicker than other portions.

In one embodiment of the present disclosure, a thickness T3 of the reinforcing rib 126 is in a range of 2 mm to 5 mm. When the reinforcing rib 126 is formed to have a thickness of less than 2 mm, the reinforcing rib 126 may not adequately serve to maintain the strength of the hybrid suspension arm 100 and prevent deformation thereof. In particular, a non-formation portion may occur in the reinforcing rib 126 due to the manufacturing tolerance of the suspension arm body 110 and strength of the reinforcing rib 126 may be degraded. Further, when the reinforcing rib 126 is formed to have a thickness exceeding 5 mm, an overall weight of the plastic insert molding 120 is increased such that it is difficult to achieve weight reduction of the hybrid suspension arm 100. Furthermore, in some cases, residual stress due to shrinkage of the plastic insert molding 120 may remain in the reinforcing rib 126 such that the strength of the reinforcing rib 126 may be degraded. In particular, when the thickness T3 of the reinforcing rib 126 exceeds 7 mm, voids may occur in the reinforcing rib 126 due to the shrinkage of the plastic insert molding 120 and the strength of the reinforcing rib 126 may be significantly degraded.

Figure 7:
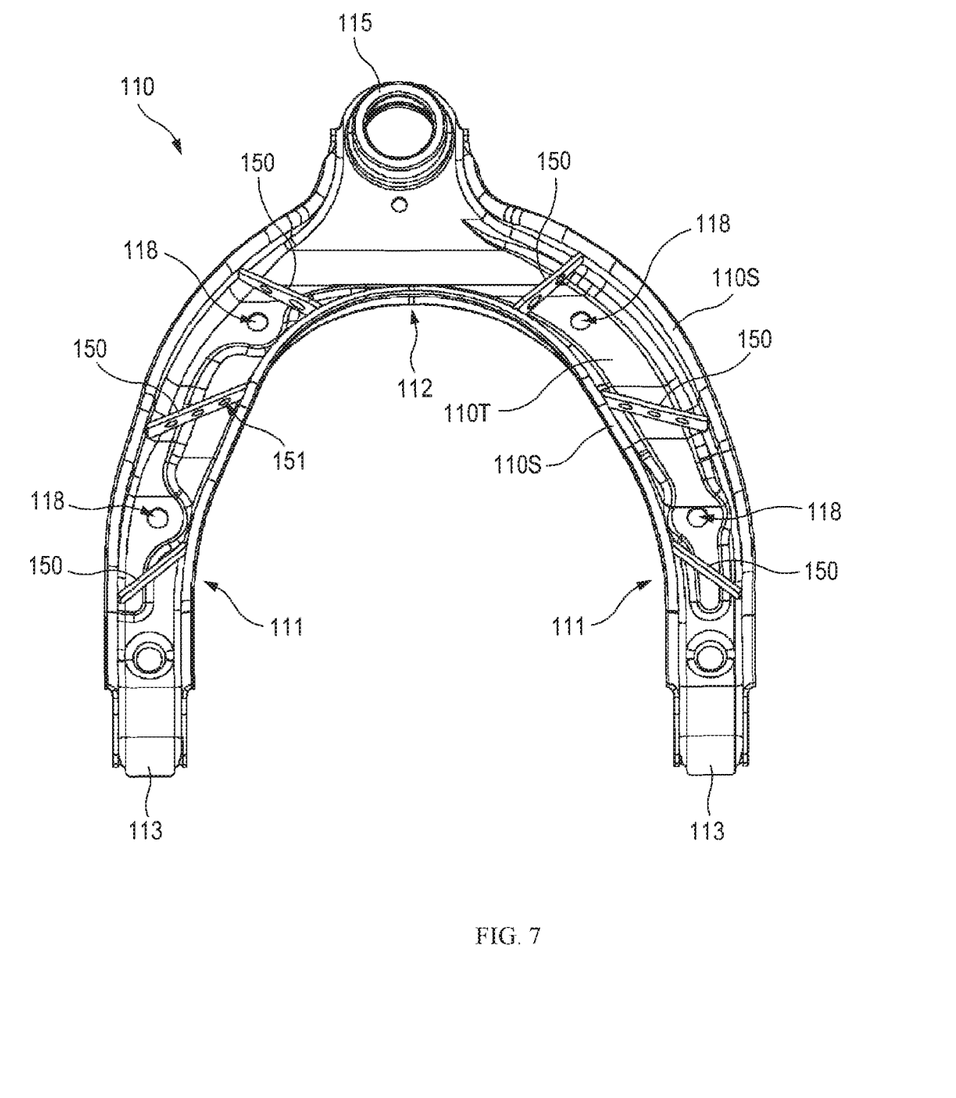
FIG. 7 is a bottom view illustrating a suspension arm body and a reinforcing plate coupled to the suspension arm body in the hybrid suspension arm for a vehicle shown in FIG. 1.

FIG. 7 is a bottom view illustrating a suspension arm body and a reinforcing plate coupled to the suspension arm body in the hybrid suspension arm according to one embodiment of the present disclosure. Further, FIGS. 8 and 9 are cross-sectional views illustrating a portion to which the reinforcing plate is coupled in the hybrid suspension arm shown in FIG. 1 by cutting in different directions.

Figure 8:
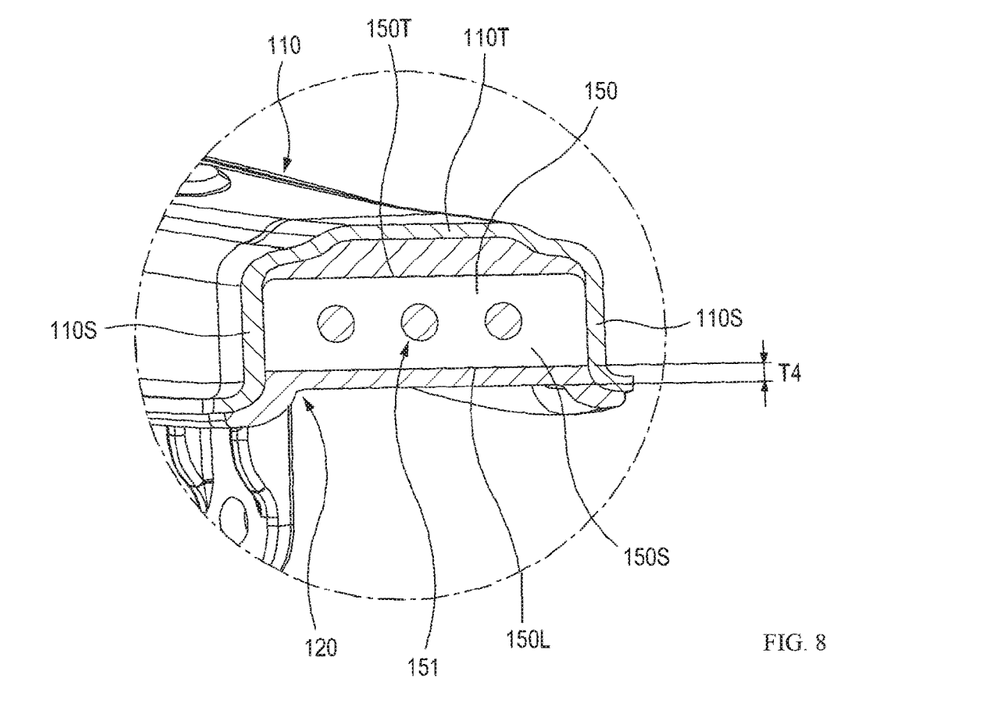
FIG. 8 is a cross-sectional view illustrating a portion to which the reinforcing plate is coupled in the hybrid suspension arm for a vehicle shown in FIG. 1.
Figure 9:
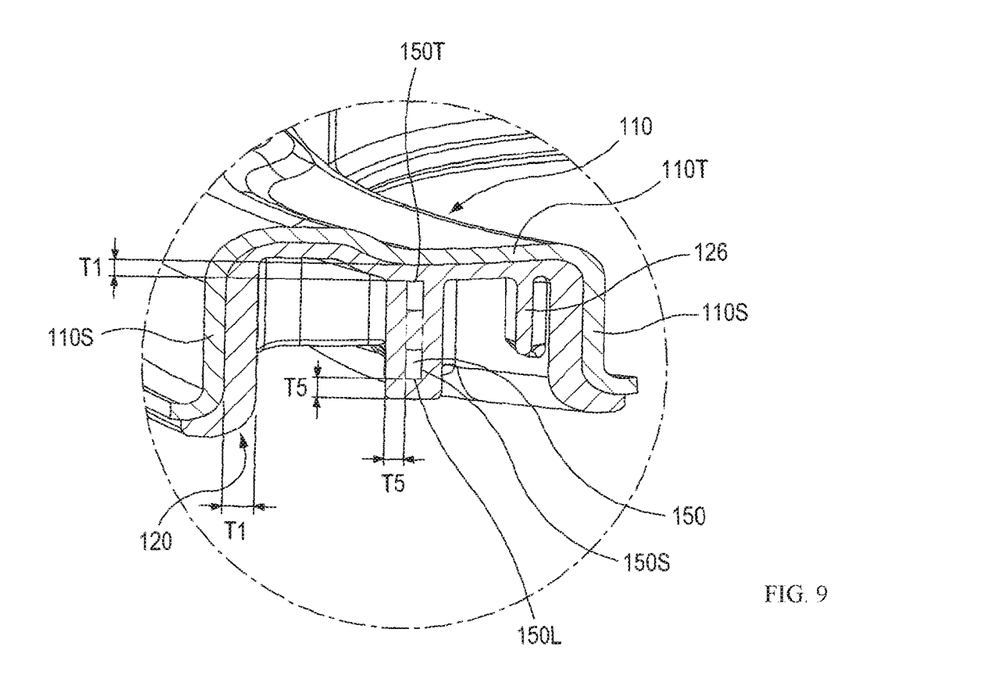
FIG. 9 is another cross-sectional view (cross-sectional view another direction) illustrating the portion to which the reinforcing plate is coupled in the hybrid suspension arm for a vehicle shown in FIG. 1.

Referring to FIGS. 7 to 9, the hybrid suspension arm 100 further comprises at least one reinforcing plate 150 fixed in the suspension arm body 110. The reinforcing plate 150 supports the suspension arm body 110 together with the insert molding 120.

The reinforcing plate 150 has a flat rectangular plate shape, and both side walls of the reinforcing plate 150 are welded and fixed to two facing sidewall parts 110S of the suspension arm body 110. In this case, the reinforcing plate 150 is welded and fixed at a position not in contact with the top plate part 110T of the suspension arm body 110. During insert molding, the reinforcing plate 150 is surrounded by the plastic insert molding 120. The reinforcing plate 150 is formed of metal material. In some cases, the reinforcing plate 150 may be formed of aluminum material in order to reduce the weight of the hybrid suspension arm 100.

At least one hole 151 may be formed to pass through the reinforcing plate 150 so as to allow the plastic insert molding 120 to be firmly coupled. The hole 151 formed in the reinforcing plate 150 is filled with the plastic insert molding 120, which is insert-molded, such that the reinforcing plate 150 is tightly coupled to the plastic insert molding 120.

In the suspension arm body 110, a plurality of reinforcing plates 150 may be fixed to each two leg parts 111 while being spaced apart from each other. The reinforcing plate 150 may be fixed to the leg parts 111 so as to direct an opening direction of the hole 151 toward a substantial side direction. The reinforcing plates 150 may be fixed with a different inclined angle with respect to the top plate part 110T according to the fixed position on the leg parts 111.

Since the reinforcing plate 150 is also made of metal material, when a portion of the reinforcing plate 150 is exposed to the outside without being covered with the plastic insert molding 120, water penetrates into a gap formed between the reinforcing plate 150 and the plastic insert molding 120 through the exposed portion to be collected, and thus the reinforcing plate 150 may be corroded.

In consideration of the above problem, a thickness T4 of the plastic insert molding 120 formed on a side surface 150L of the reinforcing plate 150 (e.g., a lower side surface), which is opposite to a side surface 150T facing the top plate part 110T, is in a range of 2.5 mm to 3 mm in one embodiment of the present disclosure, in order to ensure that the reinforcing plate 150 is always surrounded by the plastic insert molding 120. Further, a thickness T5 of the plastic insert molding 120 formed on side surfaces 150S of the reinforcing plate 150 in a thickness direction is in a range of 2.5 mm to 3 mm, as shown in FIG. 9. That is, a portion of the plastic insert molding 120 is formed between the side surface 150T of the reinforcing plate 150 facing the top plate part 110T and an inner surface of the top plate part 110T. Further, the reinforcing plate 150 is embedded in the plastic insert molding 120 so as to allow all surfaces of the reinforcing plate 150, except for both side walls of the reinforcing plate 150, to be surrounded with the plastic insert molding 120. Owing to the reinforcing plate 150, the plastic insert molding 120 is prevented from being separated from the suspension arm body 110.

The ranges of the thicknesses T4 and T5 of the portions of the plastic insert molding 120 surrounding the reinforcing plate 150 are set in consideration of a position tolerance of the reinforcing plate 150 fixed to the suspension arm body 110 by welding in addition to the manufacturing tolerance of the suspension arm body 110.

When the thickness T4 of the plastic insert molding 120 formed on the side surface 150L of the reinforcing plate 150 and the thickness T5 of the plastic insert molding 120 formed on the side surfaces 150S of the reinforcing plate 150 are less than 2.5 mm, non-formation portions may occur in the plastic insert molding 120 which is insert-molded into the corresponding portions and thus the strength of the hybrid suspension arm 100 may be degraded. Further, when the thickness T4 of the plastic insert molding 120 formed on the side surface 150L of the reinforcing plate 150 and the thickness T5 of the portion of the plastic insert molding 120 formed on the side surfaces 150S of the reinforcing plate 150 exceeds 3 mm, it is difficult to achieve weight reduction of the hybrid suspension arm 100 and the thickness of the plastic insert molding 120 becomes thicker and thus a shrinkage of the plastic insert molding 120 becomes large such that a gap of degrading the strength of the hybrid suspension arm 100 may be formed.

Hereinafter, other embodiments of the hybrid suspension arm having some differences in shape from the above-described hybrid suspension arm 100 will be described. In the hybrid suspension arm according to the other embodiments, components corresponding to the above-described hybrid suspension arm 100 may be formed with the same materials and methods as in the hybrid suspension arm 100.

Figure 10:
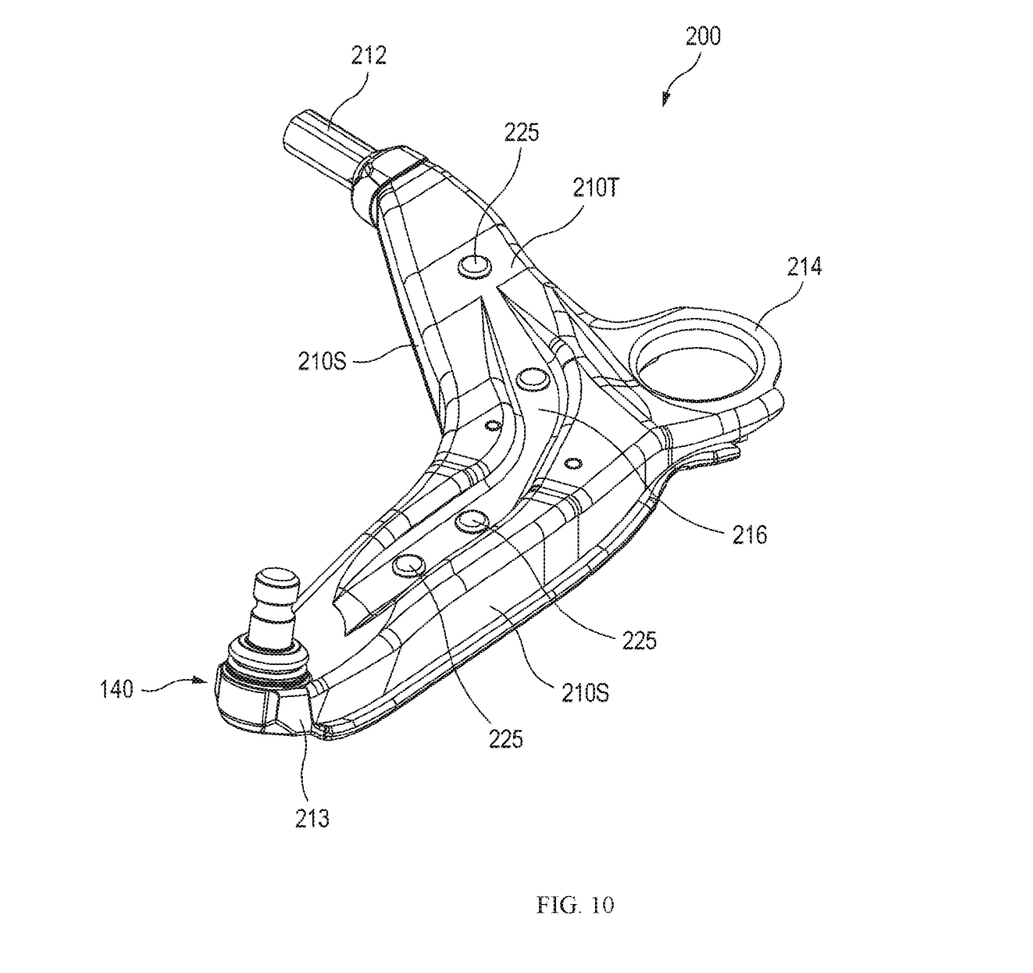
FIG. 10 is a perspective view illustrating a hybrid suspension arm for a vehicle according to another embodiment of the present disclosure.
Figure 11:
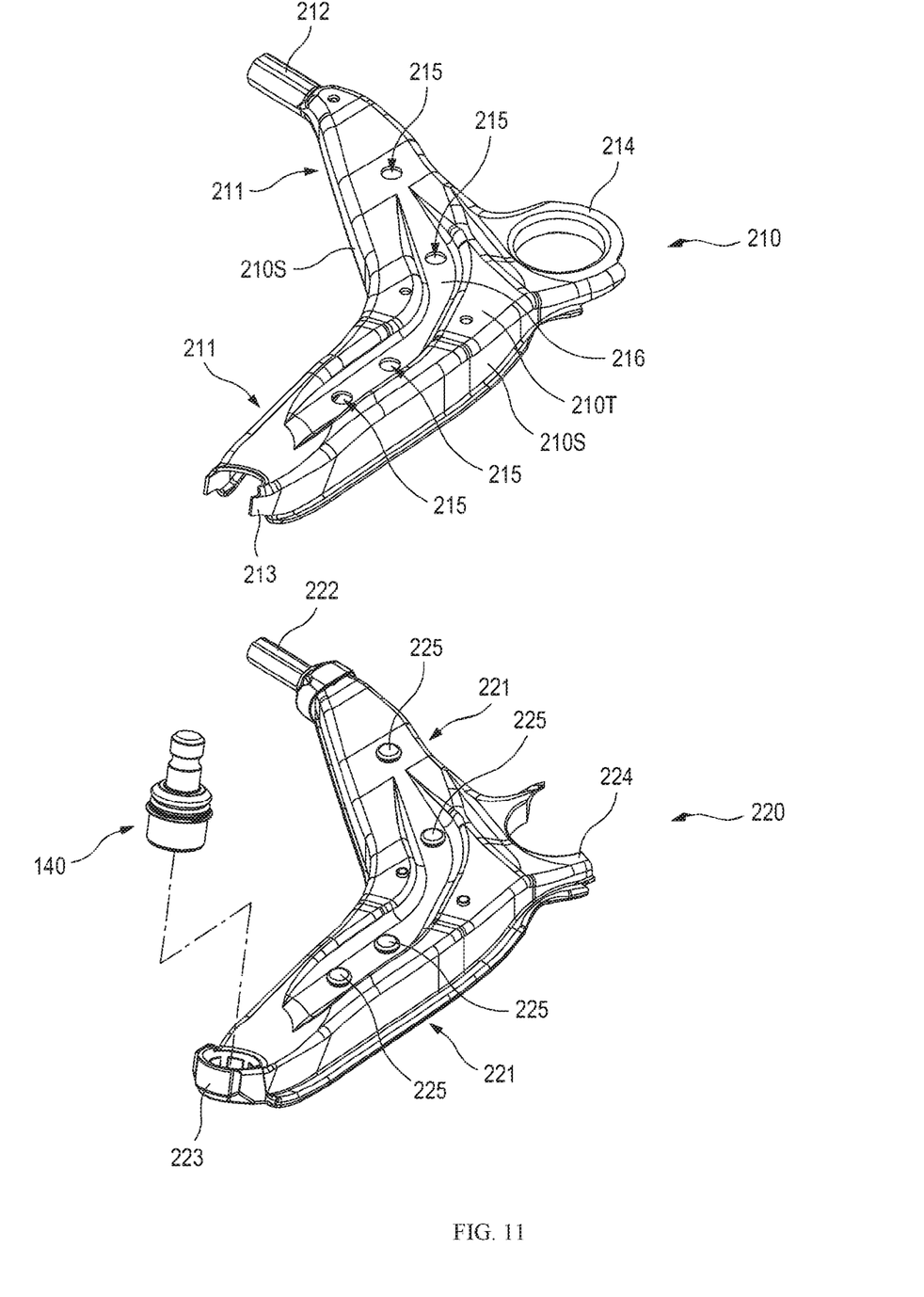
FIG. 11 is an exploded perspective view illustrating the hybrid suspension arm for a vehicle shown in FIG. 10.
Figure 12:
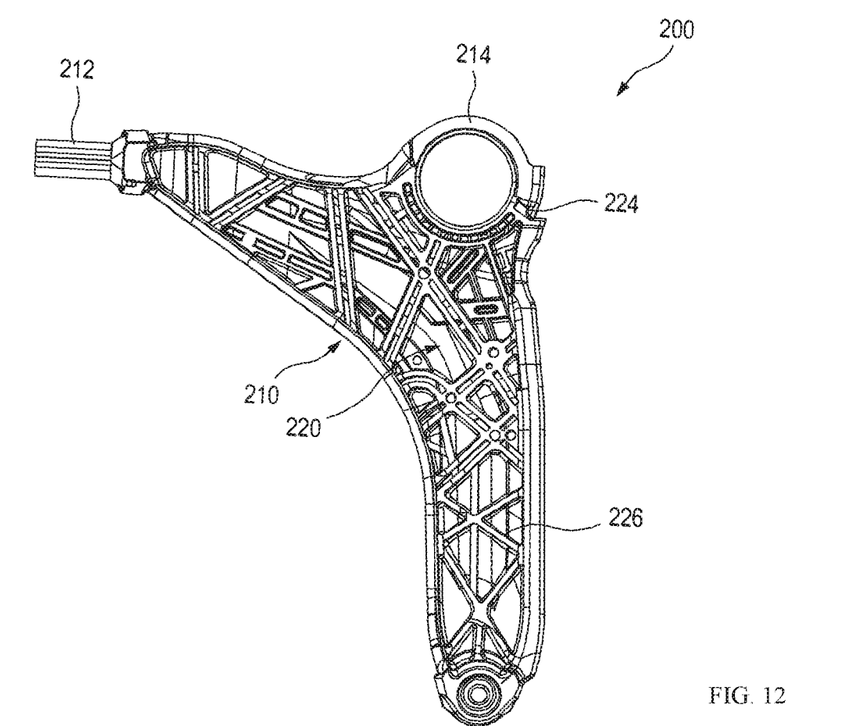
FIG. 12 is a bottom view illustrating the hybrid suspension arm for a vehicle shown in FIG. 10.
Figure 13:
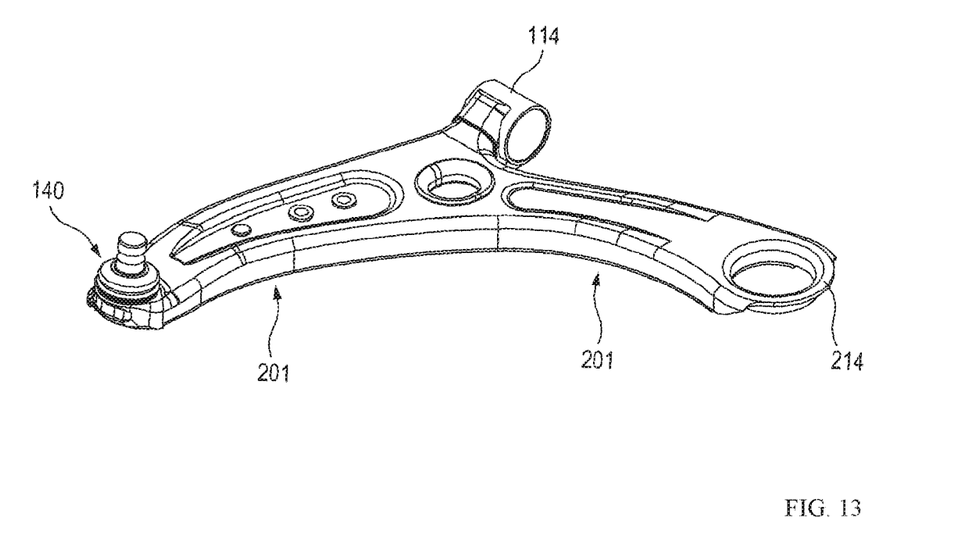
FIG. 13 is a perspective view illustrating a hybrid suspension arm for a vehicle according to still another embodiment of the present disclosure.

FIG. 10 is a perspective view illustrating a hybrid suspension arm for a vehicle according to another embodiment of the present disclosure. Further, FIG. 11 is an exploded perspective view illustrating the hybrid suspension arm for a vehicle shown in FIG. 10, and FIG. 12 is a bottom view illustrating the hybrid suspension arm for a vehicle shown in FIG. 10. Further, FIG. 13 is a perspective view illustrating a hybrid suspension arm for a vehicle according to still another embodiment of the present disclosure.

Referring to FIGS. 10 to 13, similar to the above-described hybrid suspension arm 100, a hybrid suspension arm 200 for a vehicle according to another embodiment of the present disclosure (hereinafter, simply referred to as a "hybrid suspension arm") comprises a suspension arm body 210 made of metal material, and an insert molding 220 made of plastic material which is formed by being insert-molded into the suspension arm body 210 (hereinafter, referred to as a "plastic insert molding"). The hybrid suspension arm 200 may further comprise a bush (not shown) and a ball joint 140 so as to be connected to the vehicle body or other parts (knuckle) of a vehicle. The hybrid suspension arm 200 has a "L" shape or a shape similar thereto and may be used as a lower control arm in a vehicle suspension system.

The suspension arm body 210 has two leg parts 211 integrally connected each other. A bush coupling protrusion 212 is integrally formed to protrude from one of the two leg parts 211. The bush coupling protrusion 212 may be formed in a pipe shape and a plastic insert molding 220 may be insert-molded into the bush coupling protrusion 212. For example, a bush 130 may be coupled to the bush coupling protrusion 212 by press inserting. A coupling part 213 is formed on the other of the two leg parts 211 to form a concave groove for mounting the ball joint 140. An annular circular part 214 is formed to protrude laterally from a substantially central portion of the suspension arm body 210.

A plurality of holes 215 are formed to pass through the suspension arm body 210 so as to allow the plastic insert molding 220 to be firmly coupled. Further, a recess part 216 extending from a top plate part 210T in which a plurality of holes 215 are formed to pass through is formed in the suspension arm body 210. The recess part 216 may be formed over the two leg parts 211 or may be separately formed in each two leg parts 211. When the plastic insert molding 220 is insert-molded and cooled, the plastic insert molding 120 filled in the recess part 216 formed in the suspension arm body 210 shrinks to be brought into close contact with the suspension arm body 210 and a coupling force between the suspension arm body 210 and the plastic insert molding 220 may be increased. The recess part 216 may also be applied to the hybrid suspension arm 100 according to one embodiment of the present disclosure.

The plastic insert molding 220 has a shape corresponding to the suspension arm body 210, i.e., an "L" shape or a shape similar thereto. The plastic insert molding 220 has two leg parts 221. A protrusion part 222 formed by being insert-molded into the bush coupling protrusion 212 is provided on one of the two leg parts 221, and a mounting part 223 on which a ball joint 140 is inserted and mounted is provided on the other of the two leg parts 221. The mounting part 223 may be integrally formed with the ball joint 140. Further, a semicircular part 224 formed by being insert-molded into a portion of the circular part 214 to have a shape corresponding to the circular part 214 is provided on a substantially central portion of the plastic insert molding 220.

A coupling protrusion 225 corresponding to the hole 215 formed in the suspension arm body 210 is formed in the plastic insert molding 220. The coupling protrusion 225 extends to pass through the hole 215 formed in the suspension arm body 210 and is formed to expand from the hole 215 by a predetermined area. Further, at least one reinforcing rib 226 is formed to protrude from the plastic insert molding 220, as shown in FIG. 12.

The hybrid suspension arm 200 has a structure that the ball joint 140 is mounted on one of the two leg parts 211 of the hybrid suspension arm 200, a bush coupling protrusion 212 to which a bush is inserted and coupled is formed on the other of the two leg parts 211, and an annular circular part 214 is formed in a substantially central portion between the two leg parts 211. However, the hybrid suspension arm 200 is not limited thereto and may have various structures. Alternatively, as shown in FIG. 13, the hybrid suspension arm may also have a structure that the ball joint 140 is mounted on one of two leg parts 201, an annular circular part 214 is formed on the other of two leg parts 201, a bush pipe 114 to which a bush is press-inserted and mounted is coupled by welding to a substantially central portion between the two leg parts 201.

Figure 14:
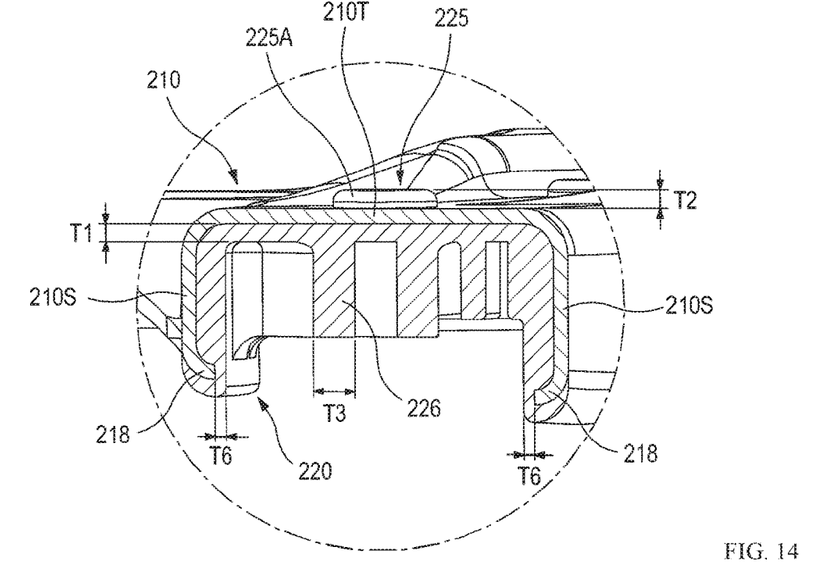
FIG. 14 is a cross-sectional view illustrating a portion adjacent to a portion in which a coupling protrusion of a leg part is formed in the hybrid suspension arm for a vehicle shown in FIG. 10.
Figure 15:
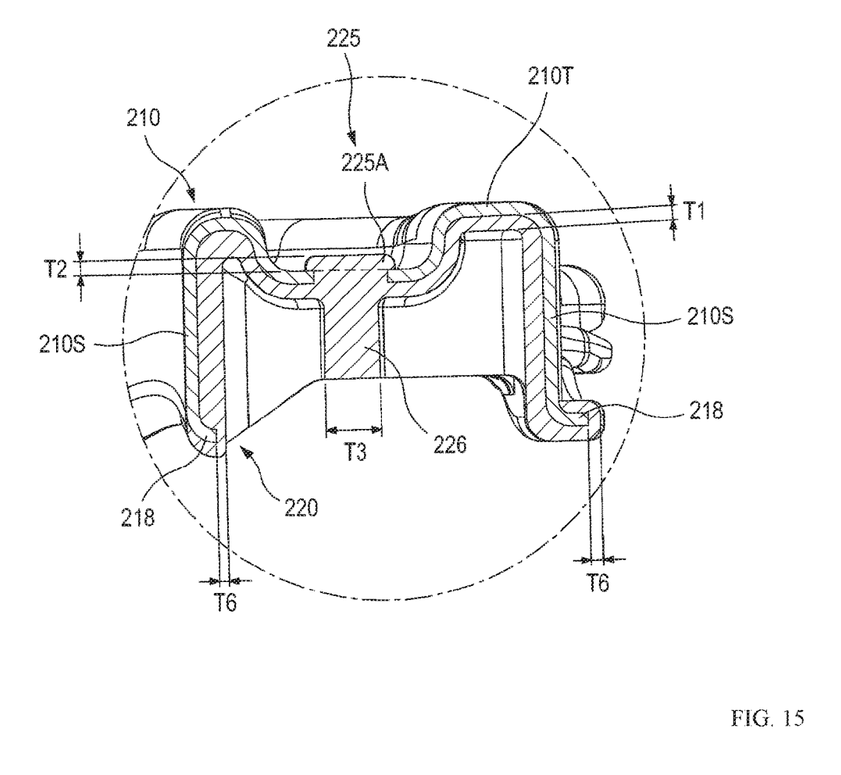
FIG. 15 is a cross-sectional view illustrating the portion in which the coupling protrusion of the leg part is formed in the hybrid suspension arm for a vehicle shown in FIG. 10.

FIG. 14 is a cross-sectional view illustrating a portion adjacent to a portion where a coupling protrusion of a leg part is formed in the hybrid suspension arm for a vehicle shown in FIG. 10, and FIG. 15 is a cross-sectional view illustrating the portion where the coupling protrusion of the leg part is formed in the hybrid suspension arm for a vehicle shown in FIG. 10.

Referring to FIGS. 14 and 15, a suspension arm body 210 has a top plate part 210T and sidewall parts 210S bent to extend from the top plate part 210T. That is, the suspension arm body 210 comprises the top plate part 210T and two sidewall parts 210S extending downward from the top plate part 210T to be open downward. The top plate part 210T and the sidewall parts 210S may be formed over an entirety of two leg parts 211.

In the hybrid suspension arm 200, a thickness T1 of at least a portion in the portion of the plastic insert molding 220 in contact with the top plate part 210T is in a range of 2 mm to 3 mm. Preferably, an overall thickness T1 of the portion of the plastic insert molding 220 in contact with the top plate part 210T is in a range of 2 mm to 3 mm. Further, a thickness T2 of an expanded portion 225A of the coupling protrusion 225 is in a range of 2 mm to 3 mm. Further, a thickness T3 of a reinforcing rib 226 is in a range of 2 mm to 5 mm.

In the hybrid suspension arm 200, a flange 218 may be formed in the suspension arm body 210 by bending an end portion of a sidewall part 210S. Further, for a solid coupling between the suspension arm body 210 and a plastic insert molding 220, the plastic insert molding 220 may be formed to surround the flange 218. As shown in FIG. 14, the flange 218 formed on the suspension arm body 210 may have a shape in which end portions of two facing sidewall parts 210S are bent inward the suspension arm body 210. As shown in FIG. 15, the flange 218 may have a shape in which one of the end portions of the two facing sidewall parts 210S is bent inward the suspension arm body 210 and the other of the end portions thereof is bent outward the suspension arm body 210.

When a portion of the flange 218 is exposed to the outside without being covered with the plastic insert molding 220, water penetrates through the exposed portion into a gap formed between the suspension arm body 210 and the plastic insert molding 220 to be collected, and thus the suspension arm body 210 may be corroded.

In consideration of the above, according to the present embodiment, in order to ensure that the flange 218 is always surrounded by the plastic insert molding 220, a thickness T6 of the portion of the plastic insert molding 220 in contact with the end of the flange 218 is in a range of 2.5 mm to 3 mm.

The range of the thickness T6 is set in consideration of a manufacturing tolerance of the flange 218 in addition to a manufacturing tolerance of the suspension arm body 110. That is, when the flange 218 is formed by bending the end portion of the sidewall part 210S, the final shape of the flange 218 formed through the bending process may not be constant, and thus a distance from the sidewall part 210S to the end position of the flange 218 may not be constant.

When the thickness T6 of the portion of the plastic insert molding 220 in contact with the end of the flange 218 is less than 2.5 mm, a non-formation portion of the plastic insert molding 120 may occur on the end of the flange 218 and strength of the hybrid suspension arm 200 may be degraded. Further, when the thickness T6 of the portion of the plastic insert molding 220 in contact with the end of the flange 218 exceeds 3 mm, it is difficult to achieve weight reduction of the hybrid suspension arm 200.

A flange similar to the flange 218 may be also formed in the hybrid suspension arm 100. In this case, a thickness of the portion of the plastic insert molding 220 in contact with an end of the flange may be in a range of 2.5 mm to 3 mm, similar to the above.

According to the above-described embodiments, steel and fiber reinforced plastic are described as an example of composite material of a hybrid suspension arm for a vehicle, but the present disclosure is not limited thereto. For example, in consideration of strength, weight, and the like of a hybrid suspension arm for a vehicle, various substitutable materials may be used in combination.

Further, as in the above-described embodiments, locally setting a thickness of the plastic insert molding formed by insert-molding process into a metal body while using composite material of metal and plastic is not applied to only a hybrid suspension arm for a vehicle and can be applied to a supporting part which requires high strength while achieving weight reduction of a vehicle component, e.g., can be applied to a module mount which is applicable to an upper control arm.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A hybrid suspension arm for a vehicle, comprising:
   a suspension arm body made of metal material and comprising a top plate part and two sidewall parts extending downward from the top plate part to be open downward;
   an insert molding made of plastic material and formed by being insert-molded in the suspension arm body; and
   at least one reinforcing plate made of metal material, installed in the suspension arm body, and having both side walls fixed to the suspension arm body to support the suspension arm body,
   wherein the reinforcing plate comprises a side surface facing the top plate part,
   a portion of the insert molding is formed between the side surface of the reinforcing plate and an inner surface of the top plate part,
   the reinforcing plate is embedded in the insert molding so as to surround all surfaces of the reinforcing plate, except for the both side walls, by the insert molding, such that the insert molding is prevented from being separated from the suspension arm body due to the reinforcing plate, and
   a thickness of at least a portion in the portion of the insert molding in contact with the top plate part and the sidewall parts is in a range of 2 mm to 3 mm.

2. The hybrid suspension arm for a vehicle according to claim 1, wherein an overall thickness of the portion of the insert molding in contact with the top plate part and the sidewall parts is in a range of 2 mm to 3 mm.

3. The hybrid suspension arm for a vehicle according to claim 1, wherein:
   at least one hole is formed to pass through the suspension arm body;
   at least one coupling protrusion extending to pass through the at least one hole and expanding from the at least one hole by a predetermined area is formed in the insert molding; and
   a thickness of the expanded portion of the coupling protrusion is in a range of 2 mm to 3 mm.

4. The hybrid suspension arm for a vehicle according to claim 1, wherein:
   at least one reinforcing rib is formed to protrude from the insert molding; and
   a thickness of the reinforcing rib is in a range of 2 mm to 5 mm.

5. The hybrid suspension arm for a vehicle according to claim 4, wherein the reinforcing rib comprises a portion extending between two facing sidewall parts of the insert molding and a portion intersecting with the portion extending between the two facing sidewall parts of the insert molding.

6. The hybrid suspension arm for a vehicle according to claim 1, wherein at least one hole filled with the insert molding is formed to pass through the reinforcing plate.

7. The hybrid suspension arm for a vehicle according to claim 1, wherein a thickness of the portion of the insert molding formed on a side surface of the reinforcing plate, which is opposite to the side surface facing the top plate part, is in a range of 2.5 mm to 3 mm.

8. The hybrid suspension arm for a vehicle according to claim 1, wherein a thickness of the portion of the insert molding formed on side surfaces of the reinforcing plate in a thickness direction is in a range of 2.5 mm to 3 mm.

9. The hybrid suspension arm for a vehicle according to claim 1, wherein:
   a flange is formed on the suspension arm body by bending an end portion of the sidewall part; and
   a thickness of the portion of the insert molding in contact with an end of the flange is in a range of 2.5 mm to 3 mm.

10. The hybrid suspension arm for a vehicle according to claim 1, wherein the suspension arm body is formed of steel material.

11. The hybrid suspension arm for a vehicle according to claim 1, wherein the insert molding is formed of fiber-reinforced plastic material.

* * * * *